No. 750,742. PATENTED JAN. 26, 1904.
W. WESTON.
PORTABLE CAMP STOVE.
APPLICATION FILED AUG. 3, 1903.
NO MODEL.
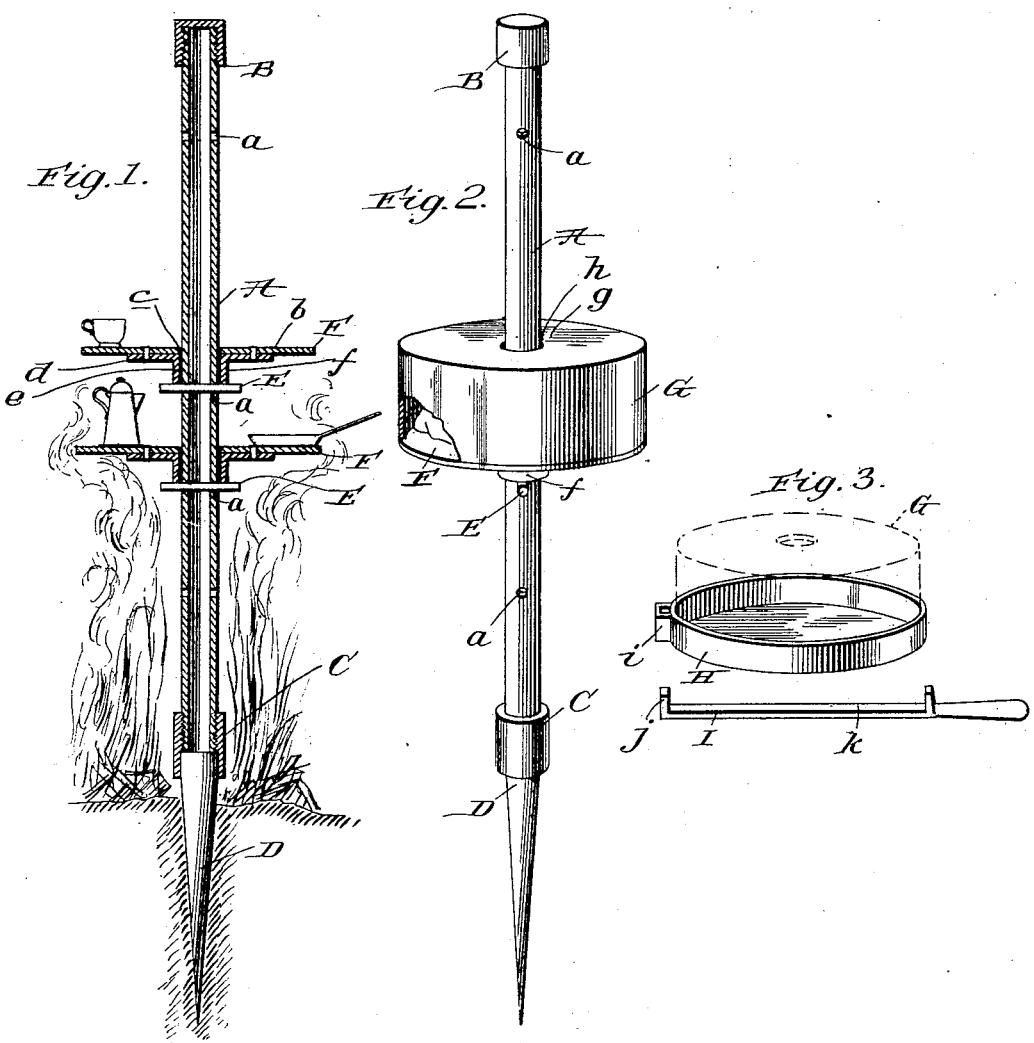

No. 750,742. Patented January 26, 1904.

UNITED STATES PATENT OFFICE.

WILLIAM WESTON, OF DENVER, COLORADO.

PORTABLE CAMP-STOVE.

SPECIFICATION forming part of Letters Patent No. 750,742, dated January 26, 1904.

Application filed August 3, 1903. Serial No. 168,040. (No model.)

*To all whom it may concern:*

Be it known that I, WILLIAM WESTON, a citizen of the United States, residing at Denver, in the county of Denver and State of Colorado, have invented new and useful Improvements in Portable Camp-Stoves, of which the following is a specification.

My invention pertains to camp-stoves; and it consists in the novel and advantageous portable camp-stove hereinafter described, and particularly pointed out in the claims appended.

In the accompanying drawings, forming part of this specification, Figure 1 is a vertical diametrical section of the stove constituting the preferred embodiment of my invention as the same appears when used without the oven comprised in my improvements. Fig. 2 is a view of the stove with the oven in use. Fig. 3 is a view of the cover designed to be placed on the oven when the latter is used as a receptacle for cups, knives, forks, and other articles used in camp life and the handle which is used in connection with the cover.

Similar letters designate corresponding parts in all of the views of the drawings, referring to which—

A is a stake or post, preferably a metallic tube or pipe exteriorly threaded at its upper and lower ends and having diametrical apertures $a$ at intervals of its length.

B is a threaded cap removably arranged on the upper end of the tube or pipe; C, a sleeve screwed on the lower end thereof; D, a wooden peg driven into the sleeve and pointed at its lower end, and E E metallic pins removably arranged in apertures $a$ of the tube or pipe and extending in opposite directions therefrom. The tube or pipe, equipped as described, is fixed in an upright position by driving the peg at its lower end into the ground, and the fire to effect the cooking is built on the ground about the tube or pipe, as illustrated.

F F are shelves removably fitted on the tube or pipe A and resting on the pins E. In the present and preferred embodiment of my invention the said shelves, of which two are preferably provided, respectively comprise an upper sheet-iron plate $b$, having a central aperture $c$ of a size to loosely receive the tube A, and a comparatively small sheet-iron plate $d$, disposed below and riveted to the upper plate and having a central aperture $e$ and a depending collar $f$, designed to bear on one of the pins E. Said plate $d$ lends rigidity and strength to the plate $b$ and prevents sagging of the same under the weight of cooking utensils, dishes, and the like placed thereon.

The stove is used with the shelves F after the manner shown in Fig. 1—that is to say, the shelves are supported by the pins E, one above the other, on the tube or pipe A. On the lower shelf—*i. e.*, that nearest the fire—pots, pans, &c., containing food to be cooked are placed, while the upper shelf serves to support utensils and dishes containing coffee and food to be kept warm without further cooking. When the cooking utensils are supported as described with relation to the fire, there is no liability of any one of them falling, as is the case when they are set directly on a wood fire, nor is it necessary for the cook to stand near the fire and in the smoke while the cooking is going on.

G is the oven of my improvements, which is also, by preference, of sheet-iron. This oven is open at its lower end and has a top $g$, provided with a central opening $h$ to receive the tube or pipe A. When the oven is to be used, the made-up dough is placed on the lower shelf F and the oven is arranged on the tube or post A and over the dough, Fig. 2, with its lower end bearing on and closed by the shelf. With the oven arranged as stated it will be observed that it will be highly heated by the fire and will confine highly-heated air about the dough, with the result that the same will be quickly converted into bread. It will also be observed that the oven will effectually prevent smoke from gaining access to and affecting the bread. When the oven is in use, the upper shelf may or may not be used on the tube or pipe A, as desired.

H is a cover designed to be placed on the oven G when the latter is removed from the tube or pipe A and used as a receptacle for various camp articles. The said cover has a loop $i$ on its perimeter designed to receive the upturned end *j* of a removable handle I, which handle is recessed, as indicated by *k*, to seat the cover. From this it follows that when the cover is removed from the oven and the handle I is engaged with the cover, as stated, the two will form a convenient pan for cooking or other purposes.

When it is desired to pack my improved stove, the shelves F and oven G are removed from the tube or pipe A, said tube or pipe is drawn from the ground, the pins E are drawn from the apertures *a* and placed in the tube, and camp articles—such as tin plates, cups, knives and forks, and pepper and salt holders—are placed in the oven, which is then closed by the cover H. These can all be readily put on a pack-animal or thrown in a wagon, and, as will be readily appreciated, there is nothing liable to be dented or otherwise injured incident to transportation.

It will be gathered from the foregoing that notwithstanding the efficiency and capacity of my improved stove and the facility with which it may be used the same is very simple and inexpensive and at the same time light and compact and is therefore adapted to be conveniently moved from place to place.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. A portable stove comprising a tube or pipe; said tube or pipe being threaded at its upper and lower ends and provided, at intervals of its height, with diametrical apertures, a removable cap engaging the upper, threaded end of the tube or pipe, a threaded sleeve arranged on the lower end of the tube, a wooden peg held in said sleeve, pins removably arranged in the apertures of the tube or pipe, and extending in opposite directions therefrom, and removable shelves arranged on the tube or pipe, and resting on the pins.

2. In a portable camp-stove, the combination with a stake or post adapted to be secured in the ground, and supporting means on said stake or post; of a shelf removably arranged on said stake or post, and an oven open at its lower end, and having a top provided with an opening to receive the stake or post; said oven being arranged on the stake or post, with its lower end resting on the shelf, and being removable from both stake and shelf.

3. A portable stove comprising a tube or pipe adapted to be secured in the ground; said tube or pipe being threaded at its upper end, and provided, at intervals of its height with diametrical apertures, a removable cap engaging the upper, threaded end of the tube or pipe, pins removably arranged in the apertures of the tube or pipe, and extending in opposite directions therefrom, removable shelves arranged on the tube or pipe, and resting on the pins, and an oven open at its lower end, and having a top provided with an opening to receive the tube or pipe; said oven being arranged on the tube or pipe, with its lower end resting on the lowermost shelf, and being removable from both stake and shelf.

4. In a portable camp-stove, the combination of a cover having a loop on its perimeter, and a handle, recessed to receive the cover, and having an upturned end adapted to rest in the loop thereof.

In testimony whereof I have hereunto set my hand in presence of two subscribing witnesses.

WILLIAM WESTON.

Witnesses:
W. A. REYNOLDS,
WM. G. SMITH.